United States Patent Office 3,413,218
Patented Nov. 26, 1968

3,413,218
PROCESS OF DEODORIZING
USING BIPHENYL
Ben Frank Miller Einsel, Joplin, Mo., assignor of one-third each to Johney Cockburn, Lampasas, and Wilton E. Scott, Houston, Tex.
No Drawing. Continuation-in-part of application Ser. No. 312,312, Sept. 30, 1963. This application Oct. 19, 1965, Ser. No. 498,080
13 Claims. (Cl. 210—18)

ABSTRACT OF THE DISCLOSURE

A process of deodorizing odor producing material such as sewage or fats during rendering operations which includes adding to the odor producing material as a novel deodorizer, biphenyl in amounts of at least 0.5 part per million of the material.

---

This application is a continuation-in-part of my copending application Ser. No. 312,312, filed Sept. 30, 1963, now abandoned.

This invention relates to a process for deodorizing. More particularly this invention relates to a method of deodorizing odor-producing materials, such as fats being rendered or otherwise treated, or sewage, and also odor-producing materials which exist in the atmosphere.

The art is replete with compositions, methods and devices for deodorizing any of the various odors which frequently occur. A number of such existing odors at times have been become acceptable, as the public has become accustomed to their existence; however, other frequently noticeable odors are those to which one cannot become easily accustomed, such as the odors that may exist in a tavern due to stale or spoiled beer; in a milk parlor having rancid milk; in conference rooms and the like with heavy tobacco smoke; in locker rooms filled with body odors; in hospitals where there are many disease odors such as those of cancer; in pet shops; lavatories; kitchens, etc. In addition to these specific locations, the plants which render animal fats are often besieged by those in the vinicity, due to the foul smelling operation inherent in any fat rendering process. Further, raw sewage which frequently is exposed to the atmosphere produces offensive odors.

To date no known method, device or composition is available to the art to economically dispose of the odors such as those mentioned above or similar offensive odors. Many attempts at deodorizing actually merely mask the odor without disposing of the odor. This susbtitution of one odor for another is not acceptable to many, and accordingly, the arts has sought an inexpensive, simple method, device or composition which can destroy common odors without merely substituting a stronger odor for the weaker one.

Accordingly, it is the principal object of the present invention to provide a method and composition for deodorizing common odors in an effective and economical manner.

This invention also has as an object destroying odors in the atmopshere substantially without regard to the type or origin of the odor.

Another and more specific object of the present invention is to provide a method and composition for destroying odors from sewage and fats, oils, greases, proteins and carbohydrates which are odor producers or which may be converted into odor producers during the process of decay and/or putrefaction, and/or in the process of being rendered or otherwise treated.

These and other objects and advantages of the present invention will become apparent to those skilled in the art from the following discription.

The essence of the present invention resides in the discovery that biphenyl alone is an effective deodorizer. Generally, biphenyl when present in amounts ranging from 0.5 to 15 parts per million effectively deodorizes the environment in which it is placed. Under certain circumstances, a concentration of biphenyl as high as 2,000 parts per million can be employed to accomplish the intended purpose.

It has also been found that biphenyl can conveniently be employed with a compounding agent such as an emulsifier or solvent, depending, of course, on the final physical form of the product desired or on the environment in which the final product is placed. It will also be recognized that the compounding agent can function as both an emulsifier and a solvent, depending on the particular choice of material as the compounding agent.

Biphenyl is well known and has been principally used as a citrus fruit preserver, a dye carrier, a stripping agent for various dyes, a raw material for various compounds, and as a mildew preventive. None of these uses suggests or even relates to the use of biphenyl alone as a deodorizer. It has been found, however, that the use of a biphenyl provides deodorization in the atmosphere if a minimum of 0.5 part per million is present in the atmosphere. Normally, it is preferred that a one part per million minimum be used. Under usual circumstances it has also been found that a maximum of approximately 15 parts per million effectively produces deodorization although higher concentrations of biphenyl can be utilized without harmful effects if the conditions and the odor in the atmosphere require such higher concentrations.

As an example of this deodorization, the atmosphere in a room 6.1 x 6.1 x 3.05 meters, having a volume of 113,490 liters, in which there was produced a concentration of gaseous biphenyl in the air of 1.207 micrograms per liter of air, resulted in complete loss of any odor and was unique in that there was an absence of any detectable odor. The above concentration was obtained by induced evaporation and/or sublimation of the normal solid biphenyl. Thus, concentrations greater than about 1.2 micrograms of biphenyl per liter can be said to remove obnoxious odors from the atmosphere.

The theory of the method by which biphenyl operates to effect deodorization is not precisely clear; however, without being bound to a particular theory, it is believed that the biphenyl reacts with the odor-producing material in the atmosphere to produce a non-odor-producing material.

Biphenyl also has been found to be advantageously employed to deodorize liquid odor-producing material, such as sewage or fats which are sold or in the process of being rendered or otherwise treated.

In both cases, and also with respect to other liquid odor-producing materials, the atmosphere is filled with odors from these liquid materials. While biphenyl has been found to be advantageously and surprisingly effective in deodorizing the atmosphere containing these odors, it has also been found to be advantageously and surprisingly effective in deodorizing the source of the odors. Accordingly, it has been discovered that biphenyl is particularly effective if added directly to the liquid or solids producing the odors. The concentration of biphenyl employed can range between 0.5 to 15 parts per million and up to 5,000 parts per million if desired with one to 3½ parts per million being suitable in a great number of instances. For instance, 10 parts per million biphenyl in a hot vat of rendering animal fats substantially eliminates the odors from the fats.

In order to facilitate the incorporation or admixture of the biphenyl with the odor-producing material, it has been found desirable to form a deodorizing composition comprising biphenyl and a compounding agent. The compounding agent can be an emulsifier, a solvent or a material which can function as both. Generally, biphenyl will be present in the deodorizing composition in amounts ranging from 0.1 to 99.9% by weight of the total composition, the remainder being the compounding agent.

The emulsifier can be any one of numerous common types, such as the nonyl-phenol ethylene oxide or alkyl aryl polyoxyethylene ether, alkyl aryl polyether alcohol, sulfonates and/or sulfates, sulfonated solubilized oils in white mineral oil, and partially hydrogenated terphenyl. The amount of the emulsifier can vary considerably under various circumstances, but when used generally, it is present in amounts ranging between 1–35% by weight of the total mixture, with about 8 to 15% preferred. An emulsifier is generally employed when the biphenyl is to be added in the treatment of sewage or in similar applications, particularly those involving aqueous solutions or dispersions. However, it is possible to omit an emulsifier in certain instances such as when fats are being rendered although it will be recognized that it can be used even in this situation if desired.

The solvents which are usable are numerous, since biphenyl is soluble in a number of organic solvents. Some of the more common that can be used are the hydrocarbons, such as mineral spirits, kerosene, benzene, xylene, turpentine, and toluene; ethers, such as ethyl ether and Cellosolve acetate; ether alcohol, such as Cellosolve and Carbitol; esters, such as methyl, ethyl, butyl and amyl acetate, ethyl lactate, diethyl phthalate and tricresyl phosphate; chloro derivatives, such as chloroform, carbon tetrachloride, ethylene dichloride, trichloroethylene, tetrachloroethane, monochlorobenzene, and orthene; ketone, such as acetone; amines, such as aniline and pyridine, and others, such as nitrobenzene and carbon disulfide. These are best representative of the many solvents that can be employed. The amount of solvent can vary between 0.1 and 99.9% of the total weight of the composition.

Representative materials which function both as an emulsifier and a solvent for biphenyl include carbowax and when employed with the biphenyl the concentration of such material generally ranges between 0.1 to 99.9 weight percent of the total composition.

It has also been found that in addition to a compounding agent, as defined hereinbefore, the deodorizing composition can include a propellant, for instance, a fluorohydrocarbon when an aerosol product is desired. Thus, a propellant such as chlorotrifluoromethane, tetrafluoromethane, chlorodifluoromethane or dichlorodifluoromethane can be employed. Other propellants can also be utilized. Ordinarily, the propellant will be present in amounts ranging from 1% to 99%, preferably, about 60%.

Typical compositions are as follows:

EXAMPLE I

| | Percent |
|---|---|
| Xylene (solvent) | 58.7 |
| Sterox NJ (emulsifier) | 8.0 |
| Biphenyl | 33.3 |

Sterox NJ—Monsanto Chemical Co., St. Louis, Mo., nonylphenol ethylene oxide or alkyl aryl polyoxyethylene ether.

A similar formulation is effective using either benzene or toluene as a solvent.

EXAMPLE II

| | Percent |
|---|---|
| Xylene (solvent) | 70.0 |
| Triton X–500 (emulsifier) | 6.0 |
| Biphenyl | 24.0 |

Triton X–500—Rhom and Haas, Philadelphia, alkyl aryl polyether alcohol sulfonates and/or sulfates.

A similar formulation may be made using either benzene or toluene.

EXAMPLE III

| | Percent |
|---|---|
| Dibutyl phthalate (solvent) | 65.0 |
| Triol 230 (emulsifier) | 7.0 |
| Biphenyl | 28.0 |

Triol 230—Carbide and Carbon, New York, N.Y., sulfonated solubilized oils in white mineral oil.

Similar formulation may be made using either xylene or butyl acetate.

EXAMPLE IV

| | Percent |
|---|---|
| Xylene (solvent) | 70.0 |
| Triton CF–10 (emulsifier) | 5.0 |
| Biphenyl | 25.0 |

Triton CF–10—Rhom and Haas, Philadelphia, alkyl aryl polyether alcohol sulfonates and sulfates.

EXAMPLE V

| | Percent |
|---|---|
| Toluene (solvent) | 50.0 |
| HB–40 (emulsifier) | 15.0 |
| Biphenyl | 35.0 |

HB–40—Monsanto, St. Louis, Mo., partially hydrogenated terphenyl, percentage HB–40 may be increased with corresponding reduction in solvent.

For use in deodorizing sewage a composition containing 58.70% xylene, 8.00% emulsifier (Sterox NJ), and 33.30% biphenyl was compared with a 60% solution of orthodichlorobenzene in an emulsifying agent. The following results were obtained when six samples of undiluted raw sewage were tested:

The six samples, of two liters each, were placed each in one gallon jugs. This allowed room to agitate the samples after addition of the treatment chemicals. The same amount of agitation was given each sample after addition of the reagents.

To the contents of three jugs was added biphenyl solution in xylene, and to the other three jugs was added orthodichlorobenzene. These reagents were added in varying amounts and checked for odors present after 30 minutes, one hour and four hours. No more than four hours was allowed to elapse as sewage from the most distant points requires no more than four hours to reach the plant, except for special samples allowed to age 72 hours before treatment.

Varying amounts of the respective reagents were added, as shown on the accompanying table, with the results, as shown, for each day.

Odor is classified as: present—P, faint—F, none—N.

The following concentrations of the reagent containing biphenyl according to the present invention and the conventional orthodichlorobenzene include the emulsifiers and solvent for biphenyl and are shown in the table as parts per million (p.p.m.) of the solution.

| Day | Hours, elapsed time | Biphenyl, solvent and emulsifier | | | | | | Orthodichlorobenzene and emulsifier | | | | | |
|---|---|---|---|---|---|---|---|---|---|---|---|---|---|
| | | Conc. | Odor | Conc. | Odor | Conc. | Odor | Conc. | Odor | Conc. | Odor | Conc. | Odor |
| 1st | ½ | 100 | N | 500 | N | 1,000 | N | 100 | N | 500 | N | 1,000 | N |
| | 1 | 100 | N | 500 | N | 1,000 | N | 100 | N | 500 | N | 1,000 | N |
| | 4 | 100 | N | 500 | N | 1,000 | N | 100 | N | 500 | N | 1,000 | N |
| 2nd | ½ | 100 | N | 500 | N | 1,000 | N | 100 | N | 500 | N | 1,000 | N |
| | 1 | 100 | N | 500 | N | 1,000 | N | 100 | N | 500 | N | 1,000 | N |
| | 4 | 100 | N | 500 | N | 1,000 | N | 100 | N | 500 | N | 1,000 | N |
| 3rd | ½ | 50 | N | 100 | N | 150 | N | 50 | N | 100 | N | 250 | N |
| | 1 | 50 | N | 100 | N | 150 | N | 50 | N | 100 | N | 250 | N |
| | 4 | 50 | N | 100 | N | 150 | N | 50 | N | 100 | N | 250 | N |
| 4th | ½ | 11 | P | 22 | F | 55 | N | 28 | P | 37 | P | 46 | F |
| | 1 | 11 | F | 22 | N | 55 | N | 28 | P | 37 | F | 46 | N |
| | 4 | 11 | F | 22 | N | 55 | N | 28 | P | 37 | N | 46 | N |
| 5th | ½ | 11 | P | 22 | F | 34 | N | 18 | P | 28 | P | 37 | N |
| | 1 | 11 | F | 22 | N | 34 | N | 18 | P | 28 | N | 37 | N |
| | 4 | 11 | N | 22 | N | 34 | N | 18 | F | 28 | N | 37 | N |
| 6th | ½ | 11 | P | 22 | F | 34 | N | 18 | P | 28 | F | 37 | N |
| | 1 | 11 | F | 22 | N | 34 | N | 18 | F | 28 | N | 37 | N |
| | 4 | 11 | N | 22 | N | 34 | N | 18 | N | 28 | N | 37 | N |
| 7th | ½ | 11 | F | 22 | N | 34 | N | 18 | P | 28 | F | 27 | N |
| | 1 | 11 | N | 22 | N | 34 | N | 18 | F | 28 | N | 37 | N |
| | 4 | 11 | N | 22 | N | 34 | N | 18 | N | 28 | N | 37 | N |
| 8th | ½ | 11 | F | 22 | N | 34 | N | 18 | P | 28 | F | 27 | N |
| | 1 | 11 | F | 22 | N | 34 | N | 18 | F | 28 | N | 37 | N |
| | 4 | 11 | N | 22 | N | 34 | N | 18 | N | 28 | N | 37 | N |

Six additional samples were collected and allowed to stand 72 hours in closed jugs before treatment was added. Results were as follows:

| Day | Hours, elapsed time | Biphenyl, solvent and emulsifier | | | | | | Orthodichlorobenzene and emulsifier | | | | | |
|---|---|---|---|---|---|---|---|---|---|---|---|---|---|
| | | Conc. | Odor | Conc. | Odor | Conc. | Odor | Conc. | Odor | Conc. | Odor | Conc. | Odor |
| 9th | ½ | 11 | F | 22 | N | 34 | N | 18 | P | 28 | F | 37 | N |
| | 1 | 11 | F | 22 | N | 34 | N | 18 | F | 28 | N | 37 | N |
| | 4 | 11 | N | 22 | N | 34 | N | 18 | N | 28 | N | 37 | N |
| | | Regular ½, 1 hr. and 4 hrs. treatment as follows: | | | | | | | | | | | |
| 10th | ½ | 7.3 | P | 15 | F | 22 | N | 18 | P | 28 | F | 37 | F |
| | 1 | 7.3 | F | 15 | F | 22 | N | 18 | P | 28 | F | 37 | N |
| | 4 | 7.3 | N | 15 | N | 22 | N | 18 | F | 28 | N | 37 | N |
| 11th | ½ | 7.3 | F | 15 | F | 22 | N | 9 | P | 18 | P | 28 | F |
| | 1 | 7.3 | F | 15 | F | 22 | N | 9 | P | 18 | F | 28 | N |
| | 4 | 7.3 | N | 15 | N | 22 | N | 9 | F | 18 | N | 28 | N |
| 12th | ½ | 7.3 | F | 15 | F | 22 | N | 9 | P | 18 | P | 28 | F |
| | 1 | 7.3 | F | 15 | N | 22 | N | 9 | P | 18 | P | 28 | N |
| | 4 | 7.3 | N | 15 | N | 22 | N | 9 | P | 18 | F | 28 | N |
| 13th | ½ | 7.3 | P | 15 | N | 22 | N | 9 | P | 18 | N | 28 | N |
| | 1 | 7.3 | F | 15 | N | 22 | N | 9 | F | 18 | N | 28 | N |
| | 4 | 7.3 | N | 15 | N | 22 | N | 9 | N | 18 | N | 28 | N |

In the above tests the amount of biphenyl is 33⅓% by weight of the concentration shown. Thus the parts per million present of the pure biphenyl is 2.4 when 7.3 parts per million of the solution is shown in the table. Since the pure orthodichlorobenzene is present in the reagent in the amount of 80% by weight, the concentration of 9 p.p.m. shown in the table is actually 7.2 p.p.m. of the pure active ingredient. Thus it can be seen that less than one-third as much biphenyl is necessary compared with the amount of orthodichlorobenzene to obtain an effective sewage treatment and to eliminate the odor.

Another use of biphenyl is in the form of a urinal block when admixed with carbowax and/or an acid such as sulfamic and/or boric acids or other comparable acid which can be formed into a disc. When used with carbowax, a composition containing 1% to 99% biphenyl, the remainder being essentially carbowax has proved particularly effective. In this embodiment of the instant invention, the carbowax functions both as an emulsifier and as a solvent.

EXAMPLE VI

The treatment of odors associated with rendering plants, the following composition has been found to advantageously deodorize the rendering operation:

Percent weight
Biphenyl _____ 0.1
Xylene _____ 99.9

EXAMPLE VII

An aerosol composition was prepared employing a conventional propellant such as a fluorohydrocarbon:

Percent
Biphenyl _____ 1.2
Isopropyl alcohol _____ 38.8
Chlorotrifluoromethane _____ 60

EXAMPLE VIII

A urinal block was prepared having the following composition:

Percent weight
Biphenyl _____ 40
Carbowax _____ 60

What is claimed is:

1. The process of deodorizing odor-emitting material consisting essentially of contacting said material with a deodorizer consisting essentially of biphenyl, said deodorizer being present in amounts of at least 0.5 part per million of said material.

2. The process of deodorizing sewage comprising adding to said sewage a deodorizer consisting essentially of biphenyl, said deodorizer being present in amounts of at least 0.5 part per million of said sewage.

3. The process of dedorizing odor-producing material during rendering comprising adding to said material being rendered a deodorizer consisting essentially of biphenyl, said deodorizer being present in a concentration of at least 0.5 part per million of said material.

4. The process of deodorizing offensive odor-emitting materials consisting essentially of adding to said material a deodorizer consisting essentially of 15 to 50% biphenyl, 1 to 35% emulsifier and 35 to 85% solvent based on the total weight of said deodorizer, said deodorizer being present in amounts sufficient to provide a concentration of biphenyl in said material of between 0.5 and 5000 parts per million.

5. The process of claim 4, wherein the emuslifier is present in amounts of 8–15%.

6. The process of deodorizing offensive atmospheric odors consisting essentially of contacting said odors with a deodorizer consisting essentially of gaseous biphenyl, said deodorizer being present in a concentration of at least 0.5 part per million of said atmospheric odors.

7. The process of deodorizing the atmosphere consisting essentially of contacting said atmosphere with a deodorizer consisting essentially of gaseous biphenyl, said deodorizer being present in a concentration of at least about 1.2 micrograms per liter of atmosphere.

8. The process of deodorizing fats during rendering comprising adding to said fats a deodorizer consisting essentially of biphenyl said deodorizer being present in amounts of 1 to 3.5 parts per million.

9. The process of deodorizing fats during rendering comprising adding to said fats a deodorizer consisting essentially of biphenyl present in amounts between 0.1 and 99.9 percent based on weight of said deodorizer.

10. A new use for biphenyl, said new use being deodorizing offensive odor-emitting material by contacting the offensive odor-emitting material with a composition consisting essentially of biphenyl.

11. The new use of claim 10 where said biphenyl is present in a concentration of at least 0.5 part per million of said offensive odor emitting material.

12. The new use of claim 10 which includes compounding with said biphenyl an emulsifier in amounts of 1–35 weight percent and a solvent in amounts of 35–85 weight percent, said biphenyl being present in amounts of 15–50 weight percent of the total.

13. The new use of claim 10 which includes incorporating said biphenyl in a deodorant composition consisting essentially of 0.1–99.9 weight percent biphenyl as the sole deodorizing ingredient therein.

References Cited

UNITED STATES PATENTS

| 2,059,125 | 10/1936 | Lyons. | |
|---|---|---|---|
| 2,164,328 | 7/1939 | Hay | 167—32 X |
| 2,173,453 | 9/1939 | Mispley et al. | 167—38.6 |
| 2,746,872 | 5/1956 | Mispley et al. | 99—171 |

FOREIGN PATENTS 209,731    9/1955    Australia.

OTHER REFERENCES

Block, S.S.: Mold and Mildew Control, Florida Engineering and Industrial Experiment Station of U. of Florida, Bulletin No. 12, November 1946, p. 48 relied on.

MICHAEL E. ROGERS, *Primary Examiner.*